United States Patent
Pradel et al.

(10) Patent No.: US 8,172,259 B2
(45) Date of Patent: May 8, 2012

(54) AIRBAG COVER FOR RECEIVING AN AIRBAG PACKAGE FOR AN AIRBAG MODULE OF A MOTOR VEHICLE AND PROCESS FOR ITS PRODUCTION

(75) Inventors: Andreas Pradel, Berlin (DE); Dirk Schröder, Neuenhagen (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/805,450

(22) Filed: Jul. 30, 2010

(65) Prior Publication Data

US 2010/0295276 A1 Nov. 25, 2010

Related U.S. Application Data

(63) Continuation of application No. PCT/EP2009/052547, filed on Mar. 4, 2009.

(30) Foreign Application Priority Data

| Mar. 4, 2008 | (DE) | 10 2008 012 944 |
| Apr. 3, 2008 | (EP) | 08075277 |
| Apr. 18, 2008 | (DE) | 10 2008 019 730 |

(51) Int. Cl.
*B60R 21/215* (2011.01)
(52) U.S. Cl. .................................................. 280/728.3
(58) Field of Classification Search ............... 280/728.3, 280/728.2, 743.1
See application file for complete search history.

(56) References Cited

U.S. PATENT DOCUMENTS

| 3,837,669 A | 9/1974 | Nagazumi et al. | |
| 4,842,300 A * | 6/1989 | Ziomek et al. | 280/732 |
| 6,131,944 A * | 10/2000 | Henkel et al. | 280/728.3 |
| 6,742,804 B2 * | 6/2004 | Suzuki et al. | 280/728.3 |
| 7,195,273 B2 | 3/2007 | Lewis et al. | |
| 7,234,725 B2 | 6/2007 | Welford | |
| 7,758,065 B2 | 7/2010 | Weigand et al. | |
| 7,874,580 B2 * | 1/2011 | Wigger et al. | 280/732 |
| 2001/0026065 A1 | 10/2001 | Floersheimer et al. | |
| 2005/0263988 A1 | 12/2005 | Welford | |
| 2006/0186646 A1 * | 8/2006 | Bauer et al. | 280/728.3 |
| 2006/0249932 A1 | 11/2006 | Marriott | |
| 2007/0222196 A1 * | 9/2007 | Harvey et al. | 280/740 |
| 2008/0290639 A1 | 11/2008 | Basten et al. | |
| 2009/0146401 A1 | 6/2009 | Wigger et al. | |

(Continued)

FOREIGN PATENT DOCUMENTS

DE 2 207 095 9/1972

(Continued)

*Primary Examiner* — Drew Brown
(74) *Attorney, Agent, or Firm* — Foley & Lardner LLP (57) ABSTRACT

An airbag cover for receiving an airbag compressed into an airbag package for an airbag module of a motor vehicle is provided. The airbag cover comprising one or more precut sections of a flexible material connecting sites, by way of which regions of the at least one precut material section are connected to each other such that the at least one precut section forms a flexible cover that at least partially receives the airbag package. The airbag cover forms an outer cover of the airbag module which is at least in sections visible for a vehicle occupant when installed into a vehicle as intended, wherein the flexible airbag cover forms a most outer casing of the airbag package. At least some of the connecting sites are configured in a disconnectable such that the corresponding connecting sites are disconnected upon the inflation and deployment of the airbag as intended in the event of a crash.

16 Claims, 9 Drawing Sheets

U.S. PATENT DOCUMENTS

2010/0109299 A1 * 5/2010 Hayashi et al. ............ 280/728.3

FOREIGN PATENT DOCUMENTS

| DE | 197 05 829 C1 | 5/1998 |
| DE | 197 18 211 A1 | 11/1998 |
| DE | 100 20 929 A1 | 11/2001 |
| DE | 20 20060 09 205 U1 | 8/2006 |
| DE | 20 20070 04 887 U1 | 6/2007 |
| DE | 10 2005 001 219 T5 | 7/2007 |
| DE | 11 2005 001 219 T5 | 7/2007 |
| DE | 20 20070 245 U1 | 8/2007 |
| DE | 10 2006 013 990 A1 | 9/2007 |
| EP | 0 875 425 A2 | 11/1998 |

* cited by examiner

FIG 16C

AIRBAG COVER FOR RECEIVING AN AIRBAG PACKAGE FOR AN AIRBAG MODULE OF A MOTOR VEHICLE AND PROCESS FOR ITS PRODUCTION

CROSS-REFERENCE TO RELATED PATENT APPLICATIONS

This application is a Continuation of International Application No. PCT/EP2009/052547, filed Mar. 4, 2009, which was published in German on Sep. 11, 2009 as WO 2009/109598 A1. The foregoing International Application is incorporated herein by reference in its entirety.

BACKGROUND

The invention relates to an airbag cover for receiving an airbag package of an airbag module, a process for the production of such an airbag cover and furthermore a process for arranging an airbag in the airbag cover according.

It is known to store an airbag for an airbag module of a motor vehicle which is inflated with gas in an event of a crash for the protection of a vehicle occupant and thereby deploys for instance between the vehicle occupant to be protected and the vehicle outer body of a motor vehicle in way of a compressed airbag package in an airbag cover which at least in part encloses the airbag package for instance cup-shaped.

Known airbag covers of the mentioned kind are typically formed as an (made of plastics) essentially dimensionally stable, at the most limited elastic cap which is provided with a rupture geometry along which the cap ruptures during inflation of an airbag arranged therein in order to release an opening for the airbag deploying during inflation.

SUMMARY

The object of the invention is to provide a new airbag cover, a process for its production and a process for integrating an airbag package in such an airbag cover which is characterized by supporting the deployment of an airbag and by a low weight while being simply manageable.

According to an exemplary embodiment of the invention the airbag cover is made of a flexible, exemplary stretchable material so that the (soft) airbag cover can adapt to the form of an airbag package arranged therein.

Such an airbag cover can be obtained in a simple manner and with low weight for instance from a textile material, plastics or leather and is thereby adaptable to a respective vehicle surrounding of the airbag cover, what is in particular of an advantage for sections of the airbag cover which (as so called visible surface)—referring to the status of the airbag cover of the airbag module when installed into a vehicle as intended—are visible (for a vehicle occupant) in the vehicle interior of the motor vehicle (namely as intended in case of a normal usage of the vehicle without taking additional specific measures for visualization of the airbag cover).

The airbag cover can be made of one or more flexible precut material sections which are connected with each other in a suitable manner, whereby some of the connections are configured as connections disconnectable (to tear open) upon inflation and deployment of an airbag arranged in the airbag cover so that the deployment behavior of the airbag can be specifically influenced.

Due to the flexibility and optionally elasticity of the airbag cover a deployment of the airbag is not only then possible, when specific connections of the airbag cover were disconnected, but the flexibility and optionally elasticity of the airbag cover allows for a certain expansion of the deploying airbag already in this status in which no disconnecting of specific connections of the airbag cover yet occurs.

Exemplary it can also be provided that parts of the flexible wall of the airbag cover which receives the airbag package is placed in at least one disconnectable fixed loop, whereby the fixation of the loop(s) is removable under the pressure of the airbag deploying during inflation so that the flexible wall of the airbag cover increases accordingly in the area of a respective loop and allows and also promotes a further expansion of the airbag package inside the airbag cover.

In order to combine a flexible airbag cover formed according to an exemplary embodiment of the invention with an airbag package to be incorporated therein to a structural unit (airbag unit) it is not necessarily required, as common in the prior art, to press the airbag package into the cover, but by using its flexibility the cover can also be folded over the airbag package by turning over, whereby furthermore fixing means for instance in form of an elastic ring revolving around the airbag package (in particular formed as a plastic band) can serve for fixing the cover on a module rack or another supporting part after turning over the cover.

It can be furthermore provided that the airbag—before placing into the airbag cover, in particular by turning over the airbag cover, whereby this is folded over the airbag package—is connected in at least one spot with the airbag cover, in particular a cover area of the airbag cover.

Hereby, the airbag can advantageously only then be compressed to an airbag package after it has already been connected to at least one spot with the airbag cover, in particular a cover area of the airbag cover.

The connection of the airbag with the airbag cover does not have to occur directly immediately, but an intermediate layer can also be provided for this purpose which is on the one hand connected with the airbag cover and on the other hand connected with the airbag.

A connection of the airbag with the airbag cover, in particular, with its cover section has furthermore the advantage that the relative position of the section of the airbag connected with the airbag cover in respect to the airbag cover, in particular in respect to its cover section, remains always the same, also in case of an occupant airbag module integrated into the wheel.

According to an exemplary embodiment of the invention the airbag cover has a shell section encompassing the airbag package and a cover section provided on a front side of the shell section, whereby the latter one can be at least partially detached from the shell section during deployment of the airbag in order to release an outflow opening for the deploying airbag.

Thereby it can be provided on the one hand that the cover section of the airbag cover stays also after the deployment of the airbag at least partially connected to the shell section, thus the cover section is in sections tightly connected (and cannot be ruptured) to the shell section. On the other hand, the airbag cover can also be designed such that its cover section is exclusively connected to the shell section by disconnectable or rupturable connecting sites so that during inflation and deployment of an airbag arranged in the airbag cover the cover section of the airbag cover is completely disconnected from this shell section. In order to prevent in such a case that the cover section of the airbag cover is uncontrolled thrown into the vehicle interior during inflation and deployment of the airbag a long-lasting connection between the cover section and the airbag arranged in the airbag cover (optionally indirect via an immediate layer) can be established.

Due to the flexible and therefore comparably soft design of the airbag cover and in particular also of the cover section of the airbag cover its long-lasting connection with the airbag does not result in an increased risk of injury for the vehicle occupant; in fact the surface appearance of the gas cushion arrangement comprising the airbag and the cover section fixed onto it can even—by suitable selection of a flexible material for the cover section—be optimized with regard to a protective effect for a vehicle occupant in the event of a crash.

The airbag cover comprising a flexible material forms advantageously the only cover which serves the reception of an airbag package being inflatable and deployable in the event of a crash. It is in particular not only a matter of a flexible casing of a folded airbag package which is stored together with the airbag package in a further form-stable module reception; but the flexible airbag cover is supposed to separate the affiliated airbag package—before its inflation and deployment—from the vehicle occupant to be protected. Therefore, no further module components shall be provided outside of the flexible airbag cover which serve the reception of the assigned airbag package. In other words, the flexible airbag cover forms advantageously the most outer casing of the corresponding airbag package—at least in direction of the vehicle occupant to be protected by the corresponding airbag module and optionally in a direction diagonally to the main deployment direction along which the airbag is expanded during inflation in direction of the vehicle occupant to be protected.

The airbag cover can furthermore serve or at least contribute to hold an affiliated airbag as an airbag package in a compressed (in particular compacted) status (while the airbag is supported by that cover, more precisely by its inner side).

A flexible airbag cover can exemplary be obtained from at least one (flat) precut material section whereby areas of the at least one precut material section are connected to each other on suitable connecting sites (which are designed at least partially as disconnectable or ruptable connecting sites).

BRIEF DESCRIPTION OF THE DRAWINGS

Further details and advantages of the invention are becoming apparent in the following description of examples based on the Figures.

FIG. 15b shows a modification of the arrangement from FIG. 15a.

DETAILED DESCRIPTION

Figure 1:
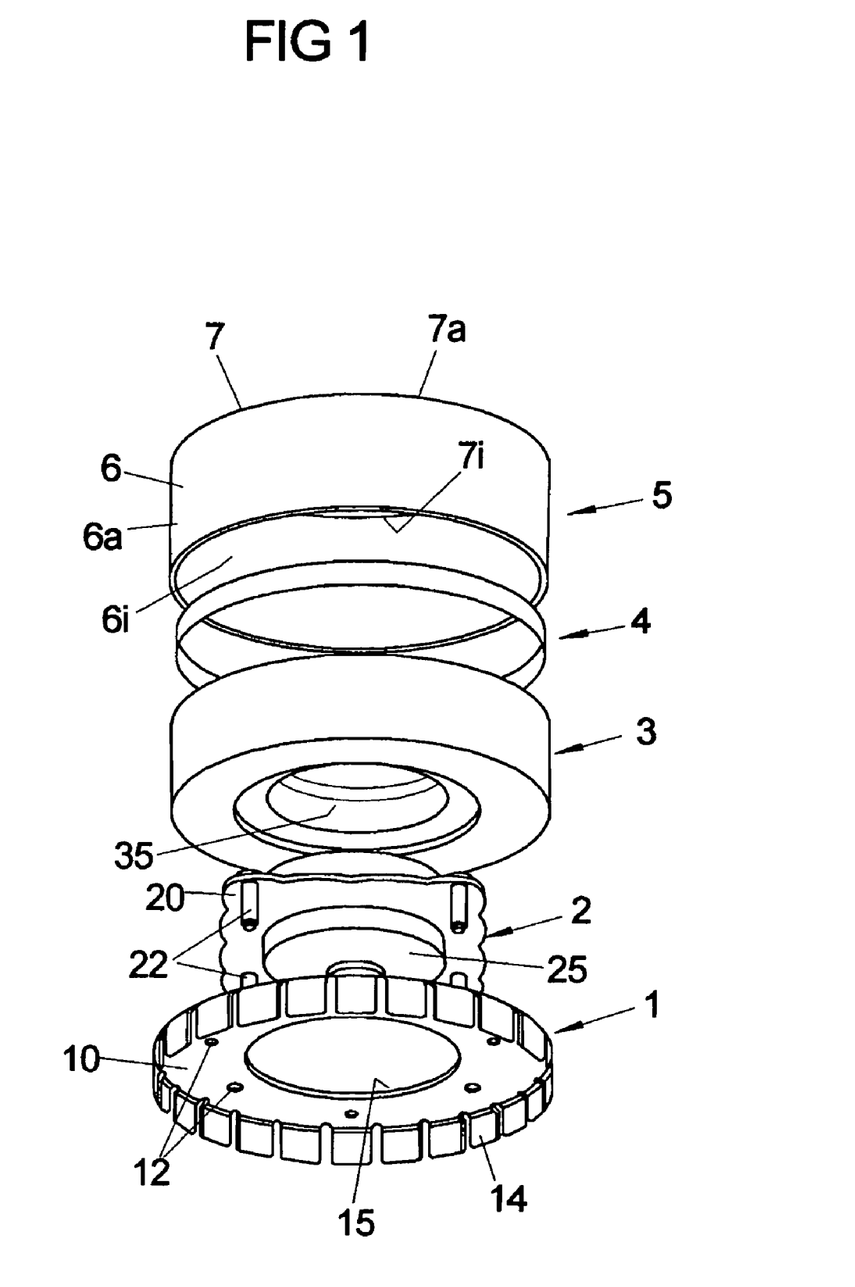
FIG. 1 shows a perspective exploded view of an airbag module with a flexible airbag cover.

FIG. 1 shows in a perspective exploded view an airbag module for use in a vehicle comprising a module rack 1 over which the airbag module can be arranged and fixed in the vehicle; a generator assembly group 2 with a gas generator 25 for inflating an airbag 3 in case of a crash in order to form herefrom a gas cushion serving the protection of a vehicle occupant; and an airbag cover 5 in which the airbag 3 in form of a compressed airbag package and at hand at least parts of the generator assembly group 2 are housed.

The airbag module shown in FIG. 1 is designed for installation into a steering wheel of a vehicle, more precisely for installation into a central steering wheel area in which the spokes of a steering wheel meet and in which also the so called steering wheel hub is arranged. This is explained in more detail further below by the means of FIGS. 7, 8 and 15a.

The following explanation of different airbag modules of the kind shown in FIG. 1 is only being done exemplary with airbag modules which are in each case set up for installation into a vehicle steering wheel. The invention to be described by the means of the embodiments which relate in particular to the modification of the airbag cover is also applicable to other airbag modules.

In case of the embodiment of an airbag module shown in FIG. 1 the module rack 1 is formed by a (circular) retaining plate 10 and has an angled outer rim 14 which serves to fixate the airbag cover 5 on the module rack 1. Furthermore, the module rack 1 is provided with fixing sites 12, here in form of fixing openings, in which affiliated fixing elements 22, here in form of fixing bolts, of the generator assembly group 2 can engage in order to fix the generator assembly group 2 to the module rack 1. The fixing elements 22 of the generator side are thereby arranged on a generator rack 20 which houses a gas generator 25 in form of a pot gas generator.

If the generator assembly group 2 is properly fixed via the fixing elements 22 on the generator side to the module rack 1 via its fixing sites 12 as for instance the fixing elements 22 on the generator side in form of fixing or threaded bolts engage into the fixing sites 12 on the side of the module rack in form of fixing openings and are secured by not shown fastening nuts, then the generator assembly group 2 rests with its generator rack 20 against the retaining plate 10 of the module rack 1 and the gas generator 25 engages in a provided (circular) recess 15 of the module rack 1.

The airbag 3 to be inflated by a gas generator 25 in the event of a crash is compressed to an airbag package for the integration into the airbag module for instance by folding, piling or other suitable measures for compacting an airbag 3. The airbag package is thereby in a form in which it has a (in the cross section essentially circular) recess 35 into which the gas generator 25 with a generator section (provided with gas outflow openings) projects so that in the event of a crash gases released from the gas generator 25 can immediately enter into the airbag 3.

An airbag cover 5, which at hand is made of a flexible, at the same time stretchable material, serves for housing the airbag 3 together with the gas generator 2 and the module rack 1, so that these can be arranged as an airbag assembly group in a vehicle, here specifically in a vehicle steering wheel.

The airbag cover 5 comprises here a circular (in the embodiment almost annular) circumferential shell section 6 and a cover section 7 provided on a front side of the shell section 6 so that shell section 6 and cover section 7 form together an essentially pot-like recess for the airbag 3 and the generator assembly group 2 and the module rack 1.

Due to its flexibility and elasticity the airbag cover 5, in a way as described further below by the means of FIGS. 2a and 2b, can thus be provided as a designated receptacle for the airbag 3 (and the generator assembly group 2 and the module rack 1) in that the airbag cover 5 is folded over the airbag 3 (and the generator assembly group 2 and the module rack 1) by turning over.

Due to its flexibility and elasticity the airbag cover 5 can furthermore serve to contribute to the compacting of the airbag package 3 and/or to hold it in a compressed, in particular in a compacted, status. For this the airbag 3 can be supported by the airbag cover 5, at hand on the shell section 6 and/or on the cover section 7, more precisely on its inner side 6i or 7i. Hereby, the airbag 3 contributes at the same time to imprint a form onto the flexible airbag cover or to stabilize the shaped form of the airbag cover.

The flexible airbag cover 5 can, as it is being described in the following, in particular by the means of the FIGS. 11a to 14, consist of one or more (flat) precut material sections which are optionally concealed with foamed material or another (soft) paneling material for compensating unevenness and to optimize the haptics of the airbag cover. This is in particular true for those sections of the airbag cover at hand, for instance the cover section 7 which form a so called visible surface, if the airbag cover or the airbag module are installed in a vehicle as intended, therefore being visible (for a vehicle occupant) in the vehicle interior.

Areas of at least one precut material section are connected to each other via connecting sites for forming the airbag cover 5 from one or multiple precut material sections, whereby at least one part of the connecting sites are designed as connecting sites which are disconnectable (rupturable) during inflation and deployment of the airbag 3 in order to provide an opening in the airbag cover 5 through which the airbag 3 can deploy and expand into the direction of a vehicle occupant to be protected.

Due to the flexibility and elasticity of the airbag cover 5 a limited expansion of the deploying airbag 3 in the event of a crash is thereby even then possible before an opening in the airbag cover 5 is released. This can be used in order to selectively optimize the deployment process of the airbag 3.

Figure 2A:
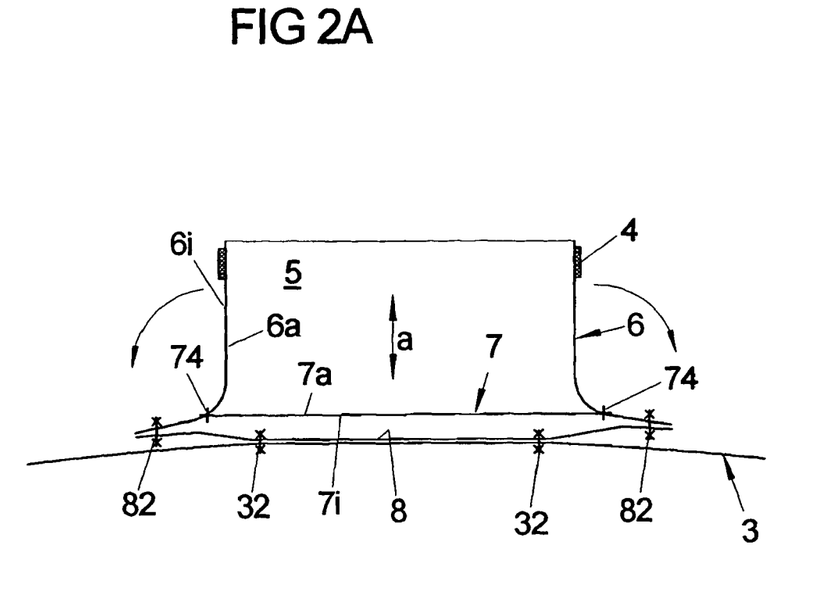
FIG. 2a shows a preparatory step for folding an airbag cover of the kind shown in FIG. 1 over an airbag of the airbag module by turning over the airbag cover.
Figure 2B:
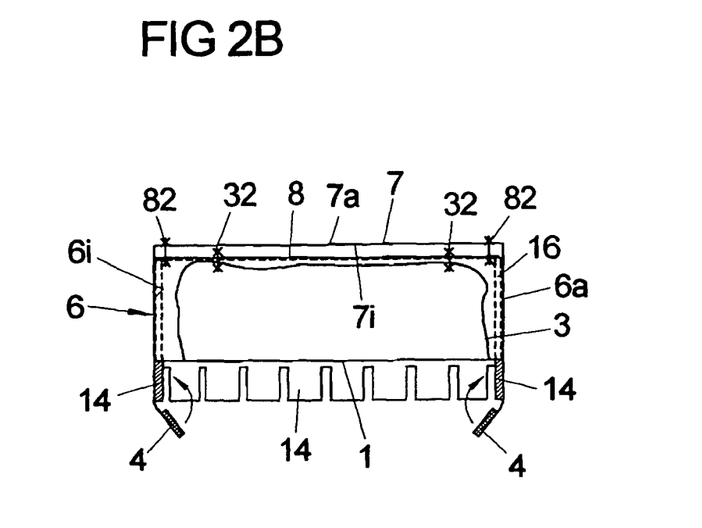
FIG. 2b shows a preparatory step for folding an airbag cover of the kind shown in FIG. 1 over an airbag of the airbag module by turning over the airbag cover.

As it will become apparent by the means of FIGS. 1, 2a and 2b the flexible, stretchable airbag cover 5 can be fixed to the module rack 1 such that the airbag cover 5 is initially provided in a turned-over or folded-over status as shown in FIG. 2a in forming the outer walls of the folded airbag cover 5 (thus the outer walls of the shell section 6 and the cover section 7) by the inner wall 6i, 7i of the airbag cover 5 arranged as intended (as shown in FIG. 1), while in turn the inner walls of the folded airbag cover 5 are formed by the outer walls 6a, 7a of the airbag cover 5 arranged as intended (as shown in FIG. 1).

Figure 5A:
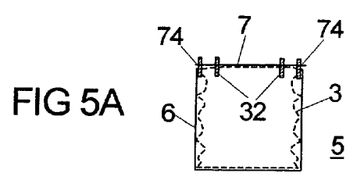
FIG. 5a shows a schematic side view of a third embodiment of a flexible airbag cover according to FIG. 1 together with an airbag arranged therein.
Figure 5B:
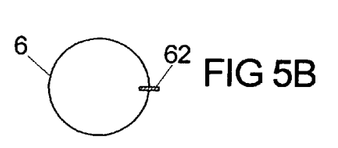
FIG. 5b shows a cross section through the arrangement of FIG. 5a without airbag.

Inasmuch it is provided in some embodiments, as for instance in case of the FIGS. 5a and 5b as well as 6a and 6b, to connect the airbag 3 to the airbag cover 5, in particular its cover section 7, via suitable connecting sites 32, for instance in form of seams, this occurs according to FIG. 2 advantageously in the folded status of the airbag cover 5, thus before this is folded over the airbag 3 by renewed turning over.

According to FIG. 2a the airbag 3 thereby does not immediately rests against the airbag cover 5 via the connecting sites 32 but rather against an intermediate layer 8 which is in turn fixed to the airbag cover 5, namely to its cover section 7, by further connecting sites 82. The intermediate layer 8 extends therefore between the cover section 7 of the airbag cover 5 and the airbag 3.

In the status shown in FIG. 2a the airbag is initially not yet compressed to an airbag package. This compression occurs in the embodiment shown in FIGS. 2a and 2b only after tying the airbag 3 to the module cover 5 via the connecting sites 32 the intermediate layer 8 and the further connecting sites 82 for instance by folding or gathering.

By the means of FIGS. 1, 2a and 2b it is further noticeable that the airbag cover 5 is provided on its (open) free front side facing away from the cover section 7 with fixing means, here in form of a mounting ring (for instance consisting of a plastic) revolving around this shell section 6 which serves to fixate the airbag cover 5 to the module rack 1.

In order to stow the airbag 3 compressed to an airbag package in the airbag cover 5 it is—by exploiting is flexibility and elasticity—turned over and folded over the compressed airbag 3 as indicated in FIG. 2a by the means of the arrows, whereby the airbag cover 5, more precisely its shell section 6, has such an extension in the axial direction that—by applying a force acting in direction of the module rack 1—the airbag cover 5, more precisely its shell section 6, projects with the end provided with a mounting ring 4 (in form of a ribbon made of plastics) over the module rack 1 and its angled rim section 14, compare FIG. 2*b*. In order to fix the airbag cover 5 to the module rack 1 the free end of the airbag cover 5 provided with a mounting ring 4 or the shell section 6 according to FIG. 2*b* is finally once more turned over to the inside so that mounting ring 4 extends in front of the inner surface of the angled rim section 14 of the module rack 1.

Due to the two-dimensional fixation of the airbag cover 5 to the module rack 1 via the mounting ring 4, which can be advantageously fixed by seams or in any other kind to the inner wall of the airbag cover 5, an accordingly even two-dimensional power transmission occurs in the area in which the airbag cover 5 and the module rack 1 are fixed to each other so that largely constant tension appears on the complete airbag cover 5.

After finishing the insertion of the airbag 3 as airbag package (as well as the module rack 1 and the generator assembly group 2 into the airbag cover 5)—by turning over the airbag cover 5—its outer walls 6*a*, 7*a* are located again outside and its inner walls 6*i*, 7*i* are located again inside as noticeable in FIGS. 1 and 2*b*.

As schematically indicated in FIG. 2*b* as a dotted line, a (essential form-stable, annular revolving) lateral wall part 16 can optionally be provided inside of the airbag cover 5, in particular in front of its shell section 6, which (as a part being open on its upper cover area) surrounds the airbag package (annular) and which can project up to the cover section 7. Hereby, an additional stabilization of the outer form of the airbag cover can be achieved. Such a wall part 16 can also form an integral (for instance formed in one piece) component of the module rack 1 or it can be provided as a separate part which however can be (separable or inseparable) connected to the module rack 1.

In FIGS. 3*a* to 6*b* different embodiments of an airbag cover 5 are schematically shown, namely in the FIGS. 3*a*, 4*a*, 5*a* and 6*a* in each case in a side view, whereby the airbag 3 (or more precisely the shape of the respective airbag package) in each case inserted into the airbag cover 5 is indicated in a dotted line and in the FIGS. 3*b*, 4*b*, 5*b* and 6*b* in each case in a cross section of the shell 6 of the respective airbag cover, whereby the airbag cover is not being shown.

Figure 3A:
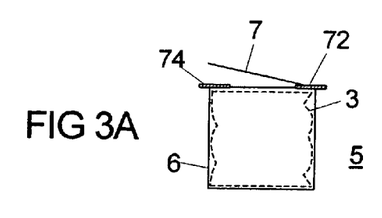
FIG. 3a shows a schematic side view of a first embodiment of a flexible airbag cover according to FIG. 1 together with an affiliated airbag.
Figure 3B:
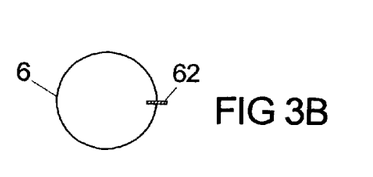
FIG. 3b shows a cross section through the arrangement of FIG. 3a without airbag.
Figure 4A:
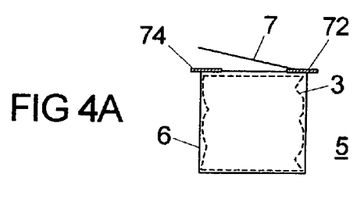
FIG. 4a shows a schematic side view of a second embodiment of a flexible airbag cover according to FIG. 1 together with an airbag arranged therein.

The two embodiments of FIGS. 3*a* and 3*b* or 4*a* and 4*b* relate in each case to an embodiment in which the cover section 7 of the respective airbag cover 5 is connected in a sub area in each case via a tight, non-disconnectable connecting site 72 for instance in form of a seam, permanently to the shell section 6 of the airbag cover 5. In further sub areas the respective cover section 7 is in contrast connected to the shell section 6 via at least one disconnectable connecting site 74, for instance in form of a tear seam. This means that during inflation and deployment of an airbag 3 arranged inside of the respective airbag cover 5 the connection between the cover section 7 and the shell section 6 is partially, namely on the disconnectable connecting site 74, separated and endures in further parts, namely on the permanent connecting sites 72. The latter connecting sites 72 form therefore a hinge which enables an opening of the cover section 7 of the airbag cover 5 during inflation and deployment of the airbag 3 as indicated in FIGS. 3*a* and 4*a*, respectively.

The embodiments of FIGS. 3*a*, 3*b* on the one hand and 4*a*, 4*b* on the other hand differ in the design of the respective shell section 6.

In case of the FIGS. 3*a*, 3*b* the shell section 6 is designed such that it is maintained during inflation and deployment of the airbag 3 arranged therein as a shell encompassing the airbag 3, so it is not opened. The shell section 6 in the embodiment of the FIGS. 3*a* and 3*b* is thereby designed of a single flexible precut material section which annularly encompasses the airbag 3 arranged to it and which both free end sections are tightly connected with each other via permanent connecting sites 62, here in form of seams not being disconnectable during inflation and deployment of the airbag 3.

Figure 4B:
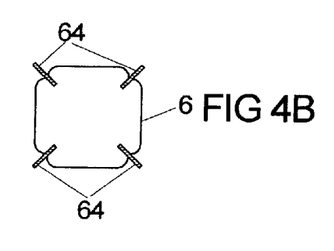
FIG. 4b shows a cross section through the arrangement of FIG. 4a without airbag.

In contrast it is provided in the embodiment of the FIGS. 4*a* and 4*b* that the shell section 6 can open during inflation and deployment of the airbag 3 provided in the airbag cover 5 wherefore corresponding disconnectable connecting sites 64, here in form of tear seams, are provided on the shell section. In the embodiment of the FIGS. 4*a* and 4*b* the shell section 6 consists thereby of multiple (four) flexible precut material sections which are connected with each other in their end sections via disconnectable connecting sites 64, respectively.

As a modification of the FIGS. 3*a*, 3*b*; 4*a*, 4*b* the permanent and disconnectable connecting sites 62, 64 can of course in each case be combined with each other for forming a respective shell section 6; and also a widening shell section 6 can be formed from only one precut material section placed in an annular shape by closing it on its (two) free end sections via a disconnectable connecting site (in form of a tear seam).

In case of the embodiments of the FIGS. 5*a*, 5*b* and 6*a*, 6*b*—unlike the embodiments of the FIGS. 3*a* to 4*b*—the cover section 7 of the respective airbag cover is connected to the corresponding shell section 6 exclusively in a detachable manner, namely via disconnectable connecting sites 74, here in form of tear seams, so that the respective cover section 7 is completely separated from the corresponding shell section 6 during inflation and deployment of the airbag 3 arranged in the respective airbag cover 5. In order to prevent an uncontrollable movement of the respective cover section 7 after the separation from the corresponding shell section 6 the respective cover section 7 is permanently connected to a section of the corresponding airbag 3 via connecting sites 32 (directly or indirectly via an intermediate layer).

The embodiments of the FIGS. 5*a*, 5*b* on the one hand and 6*a*, 6*b* on the other hand differ thereby—alike the embodiments of the FIGS. 3*a*, 3*b* and 4*a*, 4*b* in the design of the respective shell section 6.

In case of the embodiment of the FIGS. 5*a*, 5*b*—as well as in the case of the embodiment of the FIGS. 3*a*, 3*b*—a shell section 6 is provided which does not open during inflation and deployment of the corresponding airbag 3. In contrast, in the embodiment of the FIGS. 6*a*, 6*b*—inasmuch as in concordance to the embodiment of the FIGS. 4*a* and 4*b*—a shell section 5 as a shell part encompassing the airbag 3 is present which opens during inflation and deployment of the airbag 3.

Figure 7:
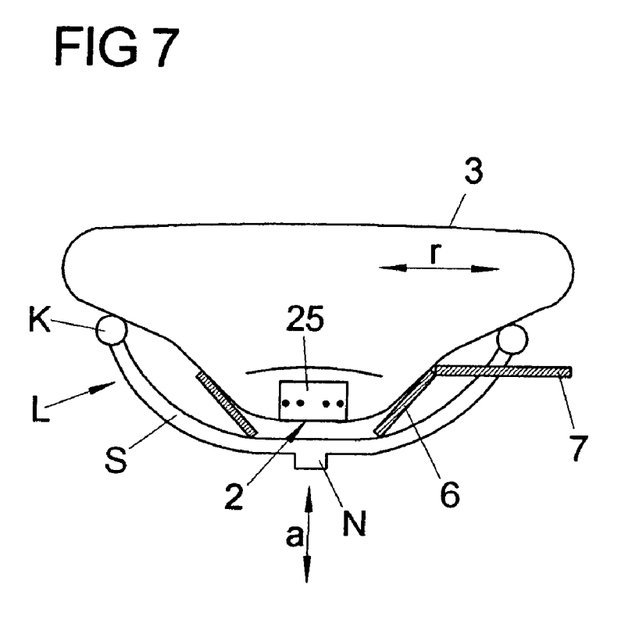
FIG. 7 shows an airbag module of the kind shown in FIG. 1 integrated into a wheel in the unfolded status of an airbag whereby the flexible airbag cover has a hinged cover section.

FIG. 7 shows a schematic cross sectional view of an airbag cover according to the FIGS. 3*a* and 3*b* inserted into a vehicle steering wheel L with a hub N, spokes S diverting from there and an annular steering wheel rim K connected to the spokes S whereby also a gas generator 25 for inflating an airbag 3 arranged in the airbag cover 5 is provided in the central steering wheel area above the hub N.

In the embodiment of FIG. 7 the airbag 3 is already largely inflated and deployed so that the airbag cover 5 has opened by turning the cover section 7 in respect to the shell section 6 for releasing an opening for the deploying airbag 3.

In contrast, in the embodiment of FIG. 7 the shell section 6 is not formed in an opening manner so that it remains after the inflation and deployment of the airbag 3 also as an annular shell part whereby, however, it is deformed during inflation and deployment of the airbag 3 due to its flexibility and elasticity, as noticeable in FIG. 7. Through this, a lateral deployment of the airbag 3 in radial direction r, namely vertical to the axial direction a extending parallel to the steering wheel axis can be promoted. Therefore, also the additional expansion of airbag 3 in the radial direction r being vertical to it is supported during inflation and deployment of the airbag 3 in addition to its expansion along the axial main deployment direction a.

In a modification of the arrangement of FIG. 7—by using an airbag cover 5 as shown in the FIGS. 4a and 4b—it can be provided for that the shell section 6 of the airbag cover opens during inflation and deployment of the airbag 3. For this, corresponding disconnectable connection sites 64 (tear seams) have to be provided on the shell section 6, as shown in FIG. 4b. Hereby a radial deployment of the airbag 3 during inflation by the gas generator 25 is additionally promoted.

Figure 8:
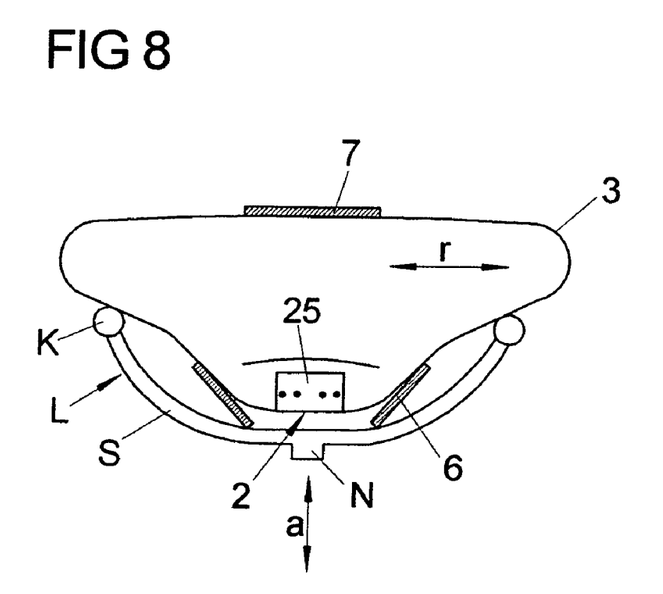
FIG. 8 shows an airbag module of the kind shown in FIG. 1 integrated into a wheel in the unfolded status of the airbag whereby the airbag cover has a cover section tightly connected to the airbag.

FIG. 8 shows according to the view of FIG. 7, again an airbag cover together with a vehicle steering wheel L and a gas generator 25 for inflating an airbag 3 provided in the airbag cover, namely in a status after the airbag 3 is already being inflated in a larger extend and is being accordingly deployed.

Diverging from the arrangement of FIG. 7 the arrangement of FIG. 8 is based on an airbag cover 5 of the kind shown in the FIGS. 5a and 5b, thus with a cover section 7 which separates completely from the shell section 6 of the airbag cover during inflation and deployment of the airbag 3 and—remains—via corresponding connecting sites 32 as shown in FIG. 5a—permanently connected to the airbag 3, in particular to an airbag section which moves into the direction of the vehicle occupant to be protected during inflation and deployment. Due to the use of a flexible, soft material for the cover section 7 of the airbag cover, no danger for the vehicle occupant to be protected is therefore connected with it. In fact, by using suitable materials for the cover section 7 the protective effect of the airbag 3 can also be optimized.

Figure 6A:
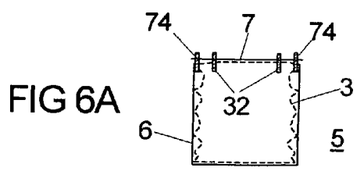
FIG. 6a shows a schematic side view of a fourth embodiment of a flexible airbag cover according to FIG. 1 together with an airbag arranged therein.
Figure 6B:
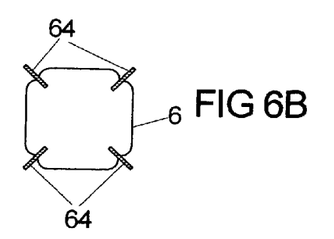
FIG. 6b shows a cross section through the arrangement of FIG. 6a without airbag.

As in case of the arrangement of FIG. 7 it can also be provided for in a modification in the arrangement of FIG. 8 that the shell section 6 opens during inflation and deployment of the airbag 3, namely by using disconnectable connecting sites 64 on the shell section 6, as shown in FIG. 6b.

Figure 9:
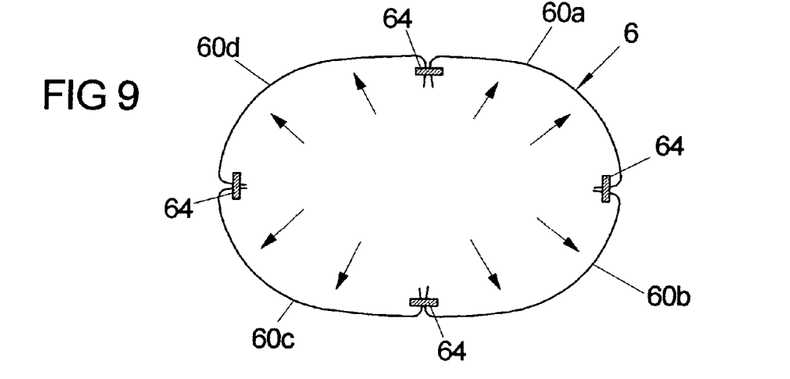
FIG. 9 shows a cross sectional view of a shell section of a flexible airbag cover which has multiple precut material sections connected with each other by tear seams.

FIG. 9 shows in a cross section based on a shell section 6 of the kind schematically shown in the FIGS. 4b and 6b which consist of four precut material sections 60a, 60b, 60c, 60d which are connected to each other on their free end areas in each case via disconnectable connecting sites 64 (in form of tear seams) that under the pressure of the deploying airbag represented in FIG. 9 by the respective arrows, the shell section 6 is initially deformed due to its flexibility and elasticity before the connecting sites 64 can be disconnected. These properties of a flexible, stretchable shell section can be specifically used in order to optimize the behavior during inflation of an airbag circular encompassed by a shell section 6.

Figure 10A:
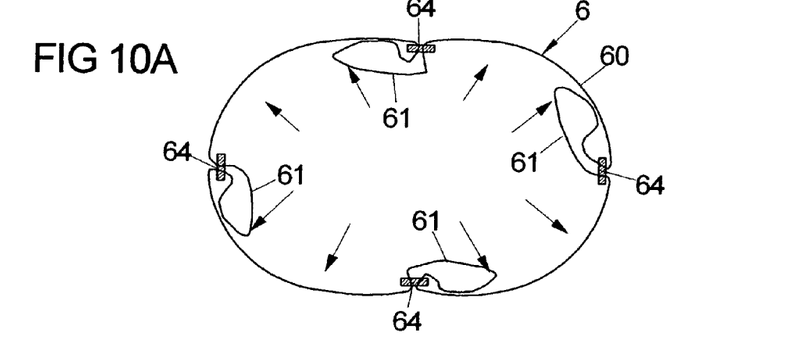
FIG. 10a shows a modification of the embodiment from FIG. 9 whereby multiple loops are formed by tear seams on a one-piece shell section of a flexible airbag cover.
Figure 10B:
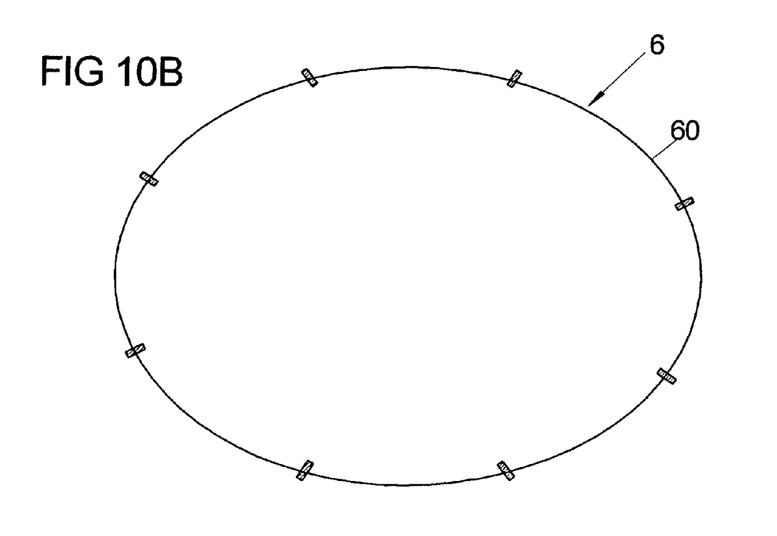
FIG. 10b shows the shell section from FIG. 10a after disconnecting the tear seams.

In FIG. 10a a modification of the shell section 6 of FIG. 9 is shown according to which the shell section 6 of an airbag cover is sectionally placed in loops 61 which are fixed by disconnectable connecting sites 64 in each case, here in form of tear seams. Under the pressure of a deploying airbag, in FIG. 10a in turn represented by arrows pointing outwards, the connecting sites 64 on the shell section 6 are disconnected and the loops 61 (forming a material reservoir) merge into a part of the shell surface of the shell section 6, as shown in FIG. 10b. This leads to a corresponding enlargement of the space enclosed by the shell section 6 and allows accordingly for a larger expansion of an airbag arranged therein in radial direction.

In case of the embodiment shown by the means of the FIGS. 10a and 10b the shell section 6 is formed—schematically shown in cross section—by a one-piece flexible precut material section 60. The loops 61 can, however, also be used in shell sections 6 which consist of multiple precut material sections connected to each other.

In the subsequently exemplified FIGS. 11a, 11b, 12a, 12b, 13 and 14 different variants of flat precut material sections are shown from which in each case a flexible airbag cover 5 can be formed.

The corresponding precut material sections consist thereby in each case of a flexible material, in particular a textile material, a sufficiently flexible plastics (for instance in form of a plastic film), a sufficiently soft leather or artificial leather or comparable flexible materials which are also advantageously stretchable and adaptable to the interior design of a vehicle.

Inasmuch as according to FIGS. 11b, 12a, 12b, 13 and 14 multiple, separate precut material sections are used for the production of an airbag cover, these can also consist of different materials.

Besides the already several times mentioned seams also further connection types as for instance welding or gluing can be used for connecting the precut material sections in order to form therefrom in each case an airbag cover.

The reference signs 62, 72 in the FIGS. 11a to 14 indicate thereby in each case permanent, solid connecting sites between areas of the respective precut material sections which are not disconnected during inflation and deployment of an airbag arranged within the respective airbag cover. The reference signs 64, 74 relate in contrast to the disconnectable (tearable) connections between areas of one or multiple material precut sections which are disconnected under the pressure of an airbag deploying in the respective airbag cover in order to release an opening for the corresponding airbag.

Figure 11A:
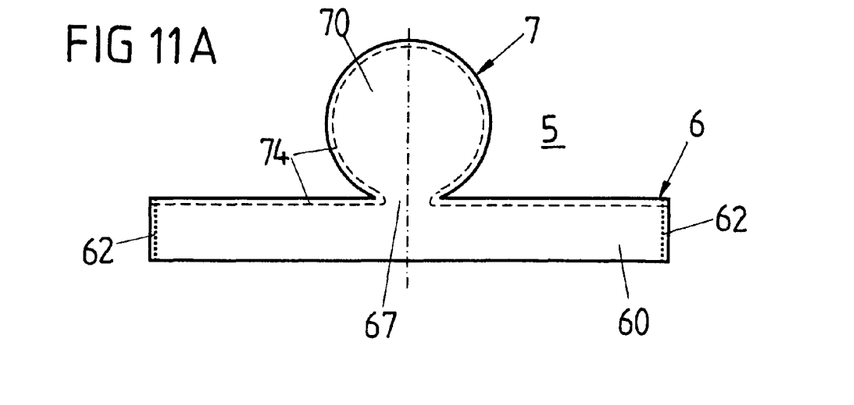
FIG. 11a shows a first embodiment of a flat precut material section for forming a flexible cover according to FIGS. 3a and 3b.

In the embodiment of FIG. 11a a single, one-piece flat precut material section is provided for forming an airbag cover 5 comprising a first material precut section area 60 for forming a shell section 6 and a second material precut section area 70 for forming a cover section 7 of the airbag cover 5 whereby the two precut material section areas 60, 70 are connected with each other in one piece via a corresponding connecting area 67. The connecting area 67 forms at the same time a hinge area around which the cover section 7 can be opened during inflation and deployment of an airbag.

The precut material section area 60 forming the shell section 6 is placed in a circular shape for forming an airbag cover 5 from the precut material section shown in FIG. 11a and the free end areas of this precut material section area 60 are connected to each other via permanent connecting sites 62. Afterwards, the precut material section area 70 forming the cover section 7—outside of the connecting area 67—is being connected to a front side of the shell section 6 via disconnectable connecting sites 74.

Figure 11B:
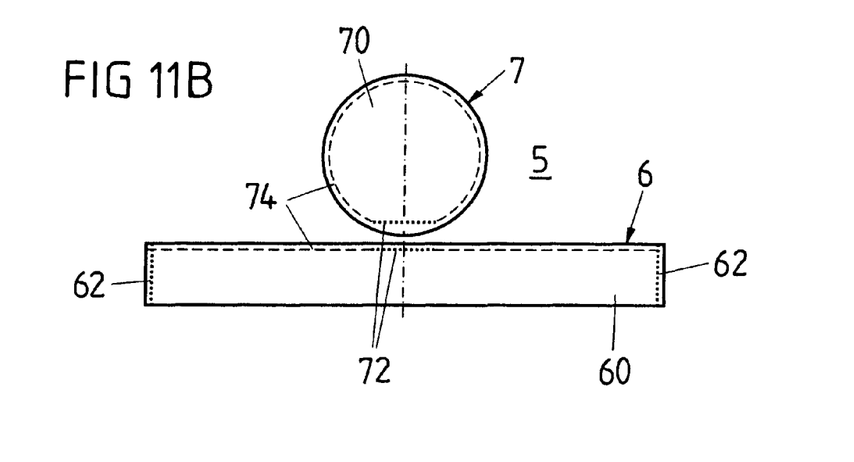
FIG. 11b shows a second embodiment of a flat precut material section for forming a flexible airbag cover according to FIGS. 3a and 3b.

FIG. 11b shows a modification of the precut material section of FIG. 11a according to which the shell section 6 and the cover section 7 of the airbag cover 5 are formed in each case by a separate precut material section 60 or 70 which, however—for forming a hinge—are connected to each other via permanent, tight connecting sites 72.

As a result, one arrives with an arrangement of the kind shown in FIG. 11a as well as with an arrangement of the kind shown in FIG. 11b at an airbag cover 5 shown in the FIGS. 3a and 3b with a shell section 6 which does not open during inflation and deployment of the respective airbag 3 and a foldable cover section 7.

Figure 12A:
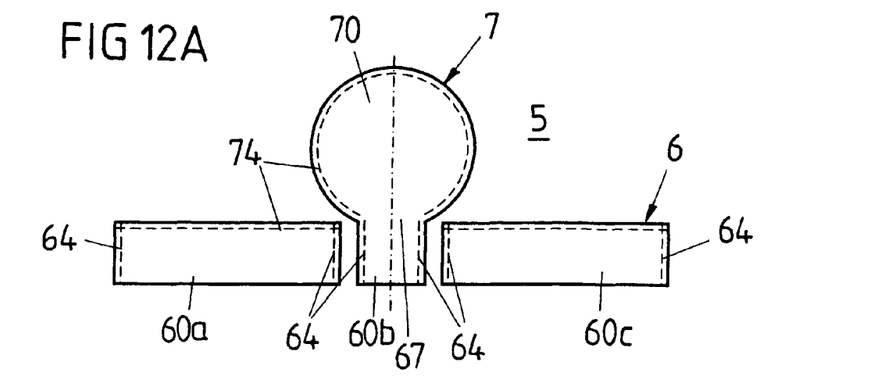
FIG. 12a shows a first embodiment of a flat precut material section for forming a flexible airbag cover according to the FIGS. 4a and 4b.

FIG. 12a shows a modification of the arrangement of FIG. 11a according to which the shell section 6 can be formed by multiple precut material sections 60a, 60b, 60c, for instance by three precut material sections, which are connected with each other in each case by disconnectable connecting sites 64 whereby one of the precut material sections (60b) forming the shell section 6 is connected in one piece via a connecting area 67 with one precut material section 70 forming the cover section 7, while the other precut material sections 60a, 60c forming the shell section 6 are connected with a precut material section 70 forming the cover section 7 in each case via the disconnectable connecting sites 74.

Figure 12B:
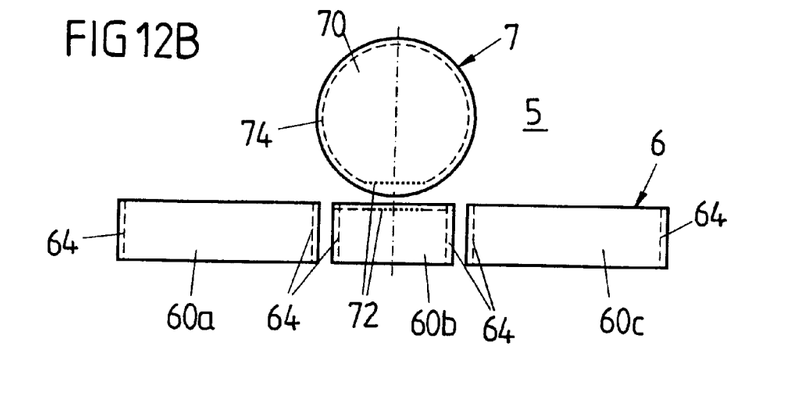
FIG. 12b shows a second embodiment of a flat precut material section for forming a flexible airbag cover according to the FIGS. 4a and 4b.

FIG. 12b shows a modification of the arrangement from FIG. 11b according to which the shell section 6 is formed of multiple precut material sections 60a, 60b, 60c of which one (60b) is permanently connected to the precut material section 70 forming the cover section 7 via a corresponding tight connecting site 72 and the others (60a, 60c) are connected herewith merely via disconnectable connecting sites 74.

An airbag cover of the kind shown in the FIGS. 4a and 4b is in each case formed by the arrangement of the FIG. 12a as well as by the arrangement of the FIG. 12b which comprises a shell section 6 opening up during inflation and deployment of an airbag 3 and foldable cover section 7.

Figure 13:
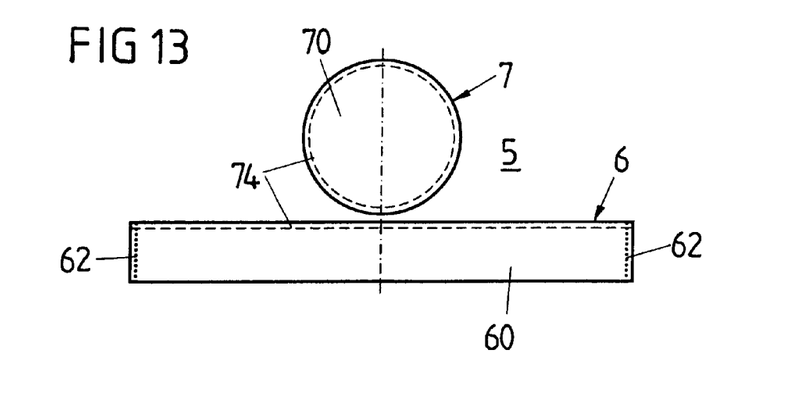
FIG. 13 shows an embodiment of a flat precut material section for forming a flexible airbag cover according to the FIGS. 5a and 5b.

FIG. 13 shows a modification of the arrangement of FIG. 11b according to which a one-piece precut material section 70 forming a cover section 7 of an airbag 5 is solely being connected via disconnectable connecting sites 74 to a front side of the precut material section 60 forming a shell section 6 of the airbag cover 5. This leads to an airbag cover of the kind shown in the FIGS. 5a and 5b, those shell section 6 stays closed during inflation and deployment of an airbag 3 arranged in the airbag cover 5 while the cover section 7 completely separates from the shell section 6.

Figure 14:
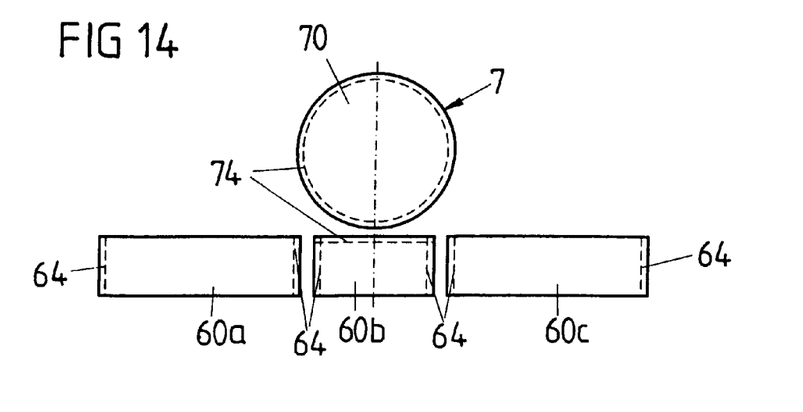
FIG. 14 shows an embodiment of a flat precut material section for forming a flexible airbag cover according to the FIGS. 6a and 6b.

FIG. 14 shows finally a modification of the arrangement of FIG. 13 with shell section 6 which consists of multiple separate precut material sections 60a, 60b, 60c which are connected to each other with their end areas via disconnectable connecting sites 64, respectively. Herewith, an airbag cover of the kind shown in FIGS. 6a and 6b is realizable in which during inflation and deployment of an airbag 3 arranged therein the shell section 6—by disconnecting the connecting sites 64—opens as well as the cover section 7 is completely separated from the shell section 6.

As noticeable by the means of the FIGS. 15a, 15b, 16a and 16b a flexible airbag cover of the kind as described before by the means of different principle views is producible in different geometries and is accordingly insertable into different airbag modules.

Figure 15A:
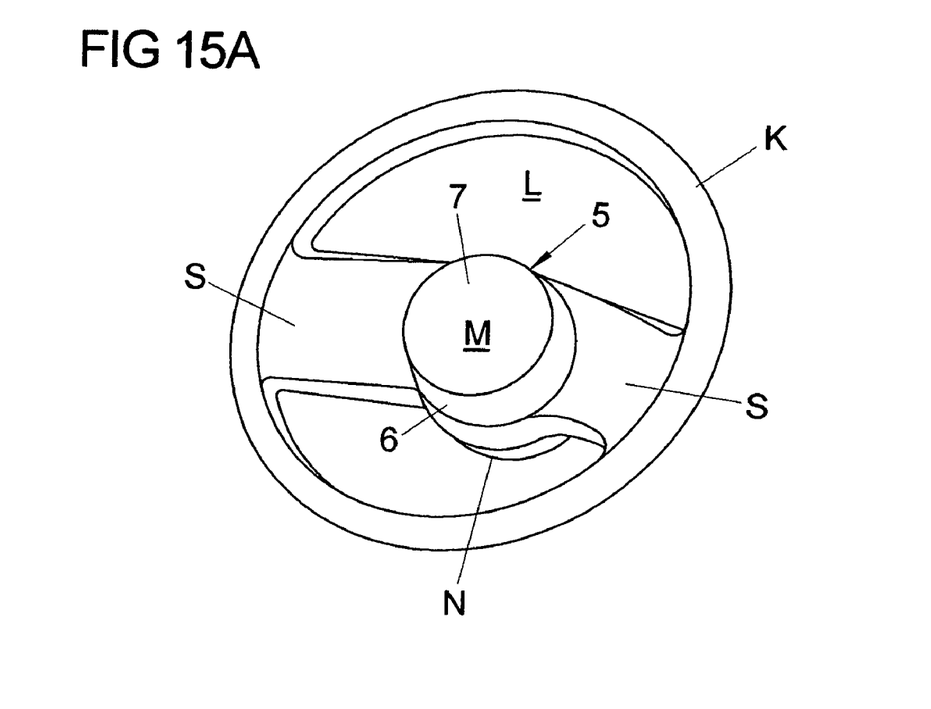
FIG. 15a shows a vehicle steering wheel with an airbag module of the kind shown in FIG. 1.

FIG. 15a shows an essentially hollow cylindrical airbag cover 5—of the kind as described by the means of FIG. 1—with a shell section 6 and a cover section 7 arranged on the front side, which is arranged on a vehicle steering wheel L having two spokes in the central area above the steering wheel hub N and houses an airbag module M provided in the central steering wheel area, thus in particular an airbag as well as a gas generator for inflating the airbag.

Such an airbag module M can be arranged for instance via a snap or latch connection on the skeleton on the vehicle steering wheel L and can thereby be stored on the steering wheel skeleton movable in such a manner that a horn function can be triggered by a force exerted onto the airbag module M.

A logo can be arranged on the flexible airbag cover 5, in particular its cover section 7, which points to the manufacturer of a vehicle in which the airbag module M is arranged, and/or to the manufacturer of the airbag module M. Such a logo can be for instance integrated into the material of the airbag cover 5 (for instance imprinted, woven into, stamped into) or can rest as a separate part (consisting of a soft, elastic or flexible material) against the airbag cover 5 or can protrude as a logo flag from the airbag cover 5, for instance sewed onto the shell section 6 in the area of a tight connection site 62.

Figure 15B:
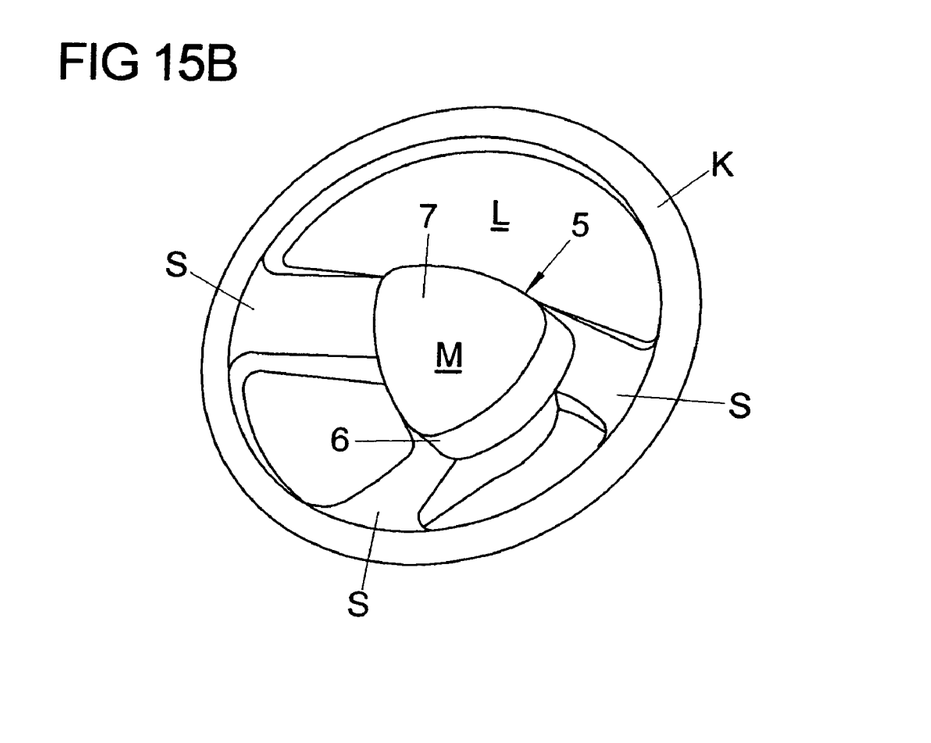

According to FIG. 15b in a modification of the arrangement of FIG. 15a an airbag module M being in its cross section essentially triangular with a corresponding flexible airbag cover 5 is advantageously provided with a vehicle steering wheel having three spokes whereby each one of the corners is assigned to one of the three spokes S.

Figure 16A:
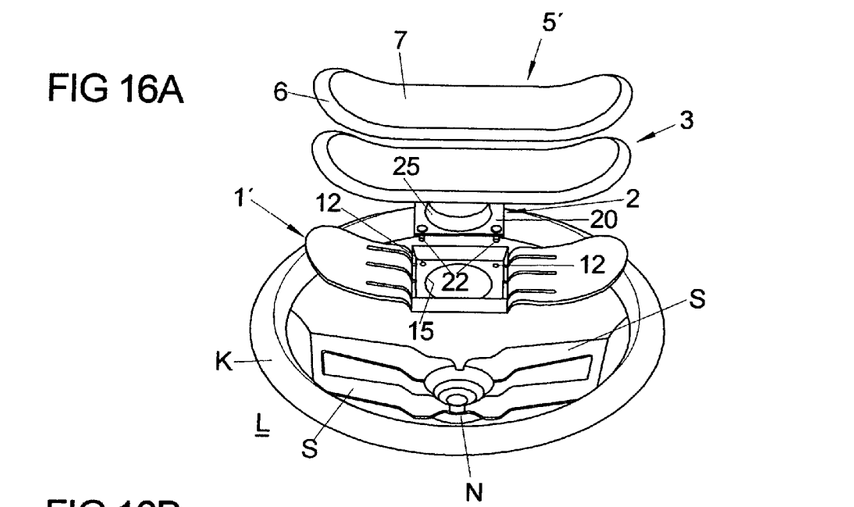
FIG. 16a shows a modification of the airbag module from FIG. 1 together with a steering wheel into which the airbag module is to be installed.
Figure 16B:
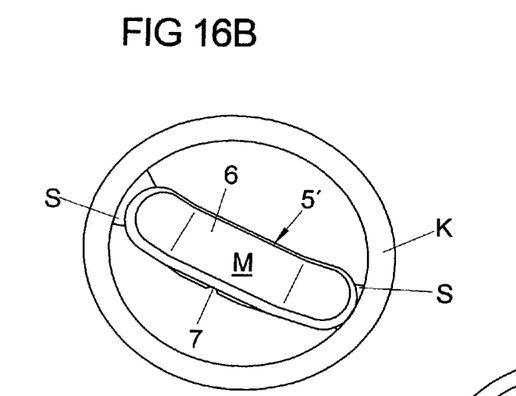
FIG. 16b shows the arrangement from FIG. 16a in the installed status of the airbag module.

The FIGS. 16a and 16b show in an exploded view as well as in a perspective view an embodiment of the arrangement from FIGS. 1 and 15a being modified in respect to the geometrical-constructional design whereby the main difference lies in the geometrical design of the module rack 1' and the module cover 5'. In the arrangement of the FIGS. 16a and 16b (along a plane spanned by the steering wheel rim K) these are designed longish such that they essentially cover completely the two spokes S of a vehicle steering wheel L having two spokes, as it in particular becomes clear by the means of the FIGS. 16a and 16b.

A vehicle steering wheel L with a circular revolving steering wheel rim K and a hub N provided in the central steering wheel area which are connected to the steering wheel rim K via two spokes S, is shown in detail in the FIGS. 16a and 16b.

The steering wheel spokes S being directly integrated into the steering wheel L form thereby a part of the steering wheel skeleton and do not have a separate jacket or encasing; since this function has being taken over by the airbag module M and in particular its airbag cover 5 in the embodiment of the FIGS. 16a and 16b. Therefore, on the one hand the module rack 1' of the airbag module M is designed longitudinally such that it essentially covers completely the skeleton of the two spokes of the steering wheel L—on the upper side of the steering wheel L facing towards the driver. The module rack 1' is in turn provided on the one hand with fixing sites 12 in form of fixing openings, which serve to fixate a generator assembly group 2 via a fixing element 22 on the side of the generator in form of a fixing bolt which engage into the fixing openings, and has on the other hand a receiving opening 15 for one part of the (pot-like) gas generator 25 of a generator assembly group 2.

Those fixing elements 22 on the side of the generator which protrude from the generator rack 20 in the embodiment, can also serve at the same time to fixate the airbag module M to the central steering wheel area by providing there accordingly assigned fixing sites, for instance in form of pass through openings, into which the fixing elements on the side of the generator in form of thread bolts engage and are secured by fastening nuts not being shown. The module rack 1', whose fixing sites 12 in form of fixing openings are reached through by the fixing elements 22 on the generator side in form of fixing bolts, is then clamped between the generator rack 20 and the central steering wheel area (above the hub N).

In the embodiment of the FIGS. 16a and 16b the airbag 3 of the airbag module is compressed to a longitudinal airbag package such that the airbag package in its outer boundaries is adapted to the longitudinal shape of the module rack 1'.

According to the FIGS. 16a and 16b a flexible airbag cover 5' with a circular revolving shell section 6 and a cover section 7 sealing the front side of the shell section 6 facing towards a vehicle occupant serve to cover the airbag assembly group consisting of the module rack 1', the generator assembly group 2 and the airbag 3, whereby the airbag cover 5' is designed such that it not only covers the airbag 3 and the generator assembly group 2 but also the module rack 1' and the steering wheel spokes S when the airbag module is installed into a vehicle as intended so that the latter is not visible for a driver sitting in front of the steering wheel.

Figure 16C:
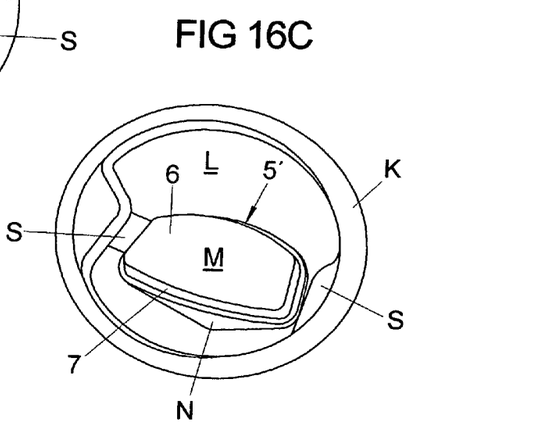
FIG. 16c shows a modification of the arrangement from FIG. 16b.

FIG. 16c shows a modification of the embodiment of FIGS. 16a and 16b in respect to the specific design of the airbag cover 5' which in the embodiment of FIG. 16c is also designed longitudinally such that it essentially covers the spokes S of a vehicle steering wheel L whereby, however, no symmetry in respect to the longitudinal direction of extension (longitudinal axis) is provided in the airbag cover 5' of FIG. 16c— unlike to the airbag cover of the FIGS. 16a and 16b.

The use of flexible and optionally stretchable (soft) materials for an airbag cover provides thereby new possibilities for preventing visible gaps to the vehicle surrounding, for instance to a steering wheel in case of a driver airbag module, and allows furthermore a design of tear seams non-visible for the driver in the airbag cover along which these rupture during inflation and deployment of an airbag in order to release an opening for the expanding airbag.

Furthermore, an airbag cover consisting of a light, flexible material can be opened under low pressure, thus reducing the requirements to the applied gas generator, and the used materials can be selected specifically such that they show preferably low variations at especially low or especially high temperatures.

The embodiments of an airbag cover previously shown are in each case characterized by the fact that the respective airbag cover consists of one or multiple flexible precut material sections which are connected to each other along defined material sections, in particular along the rim sections, for forming a flexible cover, whereby the connecting sites in respect to their resistance are characterized such that during inflation and deployment of an airbag of the airbag module at least one part of the connections is disconnected (loosened) in order to release an opening for the airbag deploying during inflation.

In case of multipart precut material sections different materials can be used for the singular precut material sections forming together an airbag cover which are in each case adapted to the function of the respective section of the airbag cover. Hence, a different material can be used for a cover section of an airbag cover located in the visible area in respect to the decoration and further material properties as for a shell section (shell part) of an airbag cover.

The flexible airbag cover shall thereby preferably in each case form the outer cover of the airbag module; that means no additional cap surrounding the airbag module is provided in which case the flexible airbag cover forms merely an intermediate layer between this cap and the respective airbag. In fact, the flexible airbag cover shall form advantageously an outer cover of the respective airbag module which in case of multiple module types, for instance driver and passenger modules, is at least in sections visible for the vehicle occupants, namely at least in its cover section. It is thereby a matter (in particular at least in case of a cover section) of visible surfaces, which are visible in the interior of a vehicle as intended.

For the production of such an airbag cover at first corresponding (flat) precut material sections are obtained which are subsequently fixed to each other for creating an airbag cover and are provided with appropriate fixing means for a later fixation of the airbag cover to a module rack. Thereby, a mounting of the fixing means to the at least one precut material section can also occur—deviant from the previously indicated order—before connecting the precut material sections.

In an improvement at least one part of the respective precut material section can undergo in an additional method step, for instance a precut material section forming the cover section of an airbag cover, a form-shaping processing (by the impact of pressure and/or temperature) so that—while maintaining the flexibility of the material—a three-dimensional basic shape is formed.

In order to compress a respective airbag, as well as optionally further components of an airbag module, as for instance a generator assembly group and/or a module rack, into an airbag cover, the flexible airbag cover is at first folded once so that the usually visible outer wall of the airbag cover points inwards and vice versa; subsequently the airbag to be stowed in the airbag cover can optionally be connected in a sub area (for example with its upper plate) also via an immediate layer with a section of the airbag cover, in particular its cover section.

In a next process step the airbag to be stowed in the airbag cover is then compressed, for instance by folding and/or gathering, and thereafter the airbag cover is folded over the airbag being compressed to an airbag package by turning over outwards so that the outer walls of the flexible airbag cover and the inner walls now also again point outwards.

Finally, the airbag cover is fixed to a holding part, as for instance a module rack or another vehicle component, via fixing means provided herefore, for instance in form of a (circular revolving) fixing band, whereby the fixation occurs advantageously on a front side of the airbag cover (bottom side) being opposite to the cover section of the airbag cover (upper side) and whereby at the same time also a tightening of the airbag cover can occur by a suitable (even) positioning of the fixing means.

Through this, the fixation of the airbag cover to a corresponding holding part can in particular be constructed such that the tension forces of the airbag cover can be absorbed without a new loosening of the airbag cover. This is in particular of importance when the airbag cover, within a pre-assembling of the airbag module, is pre-mounted to a module rack in order to be installed then together with the module rack into a vehicle as a pre-assembled airbag module. Only during arrangement of the airbag module in a vehicle the final resulting fixation of the airbag cover has to be constructed such that the forces acting on the airbag cover upon inflation and deployment of an airbag as intended in the event of a crash do not lead to an unintentional detachment of the flexible airbag cover from the one or multiple corresponding holding parts.

Although the different flexible airbag covers which were previously described by the means of an example of their use for a driver airbag module (to be integrated into a vehicle steering wheel), such a flexible airbag cover can also be used in any other module types, as for instance co-driver-, side-, head-, head-thorax-, knee- and further airbag modules. It is in particular of an advantage to use such an airbag cover in airbag modules having at least one part of the airbag cover in the visible area of the one or multiple vehicle occupants so that the specific possibilities designing a flexible airbag cover can be exploited.

It is of an advantage if the airbag cover or the material the airbag cover consists of are formed flexible and optionally stretchable and therefore soft such that for obtaining an even, straight or along a predefined curve extending surface of the airbag cover, in particular for avoiding of unevenness/crinkles in the airbag cover, an appropriate (tension) force is to be exerted onto the airbag cover. This can at the same time also affect an airbag package arranged therein in a form-shaping manner.

The restraint of the airbag cover can occur for instance by its tightening during its fixation to at least one corresponding holding part, as for instance a module rack. The acting tension forces are thereby dependent on different factors, as for instance the flexibility, softness and elasticity of the material used for the airbag cover, the ratio of tightened and untightened, stretched to unstretched, expansion of the airbag cover, on the degree of the compression of the compacted airbag package and so on. The adjustment of such influencing factors allows the use of different flexible materials for the cover, which have in part completely different elasticities, as for instance textiles, plastics (in particular in form of films), leather, artificial leather and so on.

The priority applications, Germany Patent Application No. 10 2008 012 944.5, filed Mar. 4, 2008; German Patent Application No. 08 075 277.7, filed Apr. 3, 2008; and German Patent Application No. 10 2008 019 730.0, filed Apr. 18, 2008, including the specification, drawings, claims and abstract, are incorporated herein by reference in their entireties.

What is claimed is:

1. A flexible airbag cover for receiving an airbag compressed into an airbag package for an airbag module of a motor vehicle, comprising:
    at least one precut material section of a flexible material; and
    connecting sites, by way of which regions of the at least one precut material section are connected to each other such that the at least one precut material section forms a cover that at least partially receives the airbag package,
    wherein the at least one precut material section is formed as a flat precut part before establishing connections at the connecting sites,
    wherein the airbag cover forms an outer cover of the airbag module such that the airbag cover is at least in sections visible to a vehicle occupant to be protected by the airbag module when installed into the vehicle as intended,
    wherein the flexible airbag cover forms a most outer casing of the airbag package in a direction of the vehicle occupant to be protected and in a direction diagonally to a main deployment direction along which the airbag is expanded during inflation in the direction of the vehicle occupant to be protected,
    wherein at least some of the connecting sites are configured disconnectable such that the disconnectable connecting sites are disconnected upon inflation and deployment of the airbag as intended in an event of a crash, and
    wherein the airbag cover has a shell section encompassing the airbag package and a cover section arranged on a front side of the shell section.

2. The airbag cover according to claim 1, wherein the at least one precut material section is made of a stretchable material.

3. The airbag cover according to claim 1, wherein the cover section will be at least partially detached from the shell section during the deployment of the airbag.

4. The airbag cover according to claim 3, wherein the cover section is connected with the airbag such that the cover section also remains at least partially connected to the airbag after the deployment of the airbag.

5. The airbag cover according to claim 1, wherein the shell section has at least one disconnectable connecting site from the disconnectable connecting sites, and wherein the at least one disconnectable connecting site is disconnected upon the inflation and the deployment of the airbag as intended so that an opening for the deploying airbag is formed in the shell section.

6. The airbag cover according to claim 1, wherein the airbag cover has fixing means through which the airbag cover is fixable to a dedicated holding means.

7. The airbag cover according to claim 6, wherein the fixing means comprise a fixing ring which revolves on the airbag cover via which the airbag cover can be braced against the holding means.

8. The airbag cover according to claim 1, wherein the airbag cover is held by a dedicated holding means under tension in order to impose a defined form onto the flexible airbag cover.

9. The airbag cover according to claim 1, wherein the airbag cover is foldable over the airbag package for receiving the airbag, whereby the airbag cover is turned over.

10. A process for arranging an airbag package in a flexible airbag cover according to claim 1, comprising:
    first folding the airbag cover such that an outer side of the airbag cover points inwardly and an inner side of the airbag cover points outwardly, and
    subsequently folding the airbag cover over the airbag package by turning the airbag cover over so that the airbag is received by the airbag cover and the outer side of the airbag cover points outwardly and the inner side of the airbag cover points inwardly.

11. The process according to claim 10, wherein, before folding the airbag cover over the airbag package, the airbag is connected with the airbag cover on at least one connecting site from the connecting sites.

12. The process according to claim 11, wherein the airbag is compressed into an airbag package after the airbag cover is connected to the airbag on the at least one connecting site.

13. The process according to claim 10, wherein the airbag cover is fixed to a supporting part after folding the airbag cover over the airbag package.

14. A process for production of a flexible airbag cover, comprising:
    obtaining the airbag cover from at least one precut material section made of a flexible material, and
    connecting regions of the at least one precut material section with each other at connecting sites such that sections of the airbag cover are visible to a vehicle occupant in a vehicle interior of a motor vehicle when the airbag cover of the airbag module is installed in the vehicle as intended,
    wherein a flat precut part is used as the precut material section before establishing connections at the connecting sites,
    wherein at least some of the connecting sites are configured disconnectable such that the disconnectable connecting sites are disconnected upon the inflation and deployment of the airbag as intended in an event of a crash,
    wherein the flexible airbag cover is provided with an elastic ring which revolves around the airbag cover via which the airbag cover can be braced against a supporting means such that the airbag cover is fixable to a vehicle part.

15. The process according to claim 14, wherein the regions of the at least one precut material section are connected to each other such that the at least one precut material section forms a cover that at least partially receives the airbag package.

16. The process according to claim 14, wherein the airbag cover forms a most outer casing of the airbag package in a direction of the vehicle occupant and in a direction diagonally to a main deployment direction along which the airbag is expanded during inflation in the direction of the vehicle occupant.

* * * * *